United States Patent Office 2,854,461
Patented Sept. 30, 1958

2,854,461

NEW POLYEPOXIDES, PARTICULARLY DIEPOXIDES, AND METHOD OF MAKING SAME

Melvin De Groote, University City, Kwan-Ting Shen, Brentwood, and Jen-Pu Cheng, Richmond Heights, Mo., assignors to Petrolite Corporation, Wilmington, Del., a corporation of Delaware No Drawing. Application March 9, 1954
Serial No. 415,178

2 Claims. (Cl. 260—348)

The present invention is concerned with a new class or variety of polyepoxides and particularly diepoxides. Furthermore, it is concerned with a method for making the same.

Briefly stated, the present invention is concerned with a polyepoxide of the structure $$R \begin{array}{c} (OH)_m \\ (O-\overset{H}{\underset{H}{C}}-\overset{H}{\underset{}{C}}\underline{\phantom{XX}}\overset{H}{\underset{O}{C}}H)_{m'} \end{array}$$

in which $m$ is a small whole number not over 4 and including 0, and $m'$ is a small whole number varying from 2 to 4, and R is the residual radical of the polyol $$R_3 \begin{array}{c} (OH)_n \\ (OR_1)_{n'}(OR_2OH)_{n''}(OH)_{n'''} \end{array}$$

in which $n$ is a small whole number varying from 0 to 4, $OR_1$ is selected from the class of oxyethylene radicals, oxypropylene radicals, and oxybutylene radicals; $OR_2OH$ is selected from the class of oxy(hydroxy)propylene radicals and oxy(hydroxy)butylene radicals; $n'$ is a numeral varying from 2 to 200; $n''$ and $n'''$ is a numeral varying from 0 to 8; with the proviso that there must be present at least two hydroxyl radicals in the precursory diol and with the further proviso that said precursory polyol $$R_3 \begin{array}{c} (OH)_n \\ (OH)_n \end{array}$$

be characterized by being (a) water-insoluble, (b) hydrophobe solvent-soluble, and (c) free from any radical having at least 5 uninterrupted carbon atoms.

As previously noted, the present invention is concerned with a process for making the same aforementioned polyepoxides.

For sake of convenience, what is said hereinafter will be divided into three parts:

Part 1 is concerned with general descriptive matter,
Part 2 is concerned with the preparation of the herein described polyepoxides, and
Part 3 is concerned with uses for said new polyepoxides.

PART 1

For sake of simplicity reference will be made largely to diepoxides for the reason that such compounds are the preferred class and the most important class of the present invention. This is true also in light of ease of comparison with other available diepoxides.

At present there are available two types of diepoxides, one being a diepoxide in which there is present at least one or more hydrophobe radicals characterized by the presence of at least 5 uninterrupted carbon atoms. These materials are widely used for a variety of purposes and particularly in the preparation of epoxy resins. They are sold by at least one or more companies and are readily available in the open market.

Of the two types of diepoxides the hydrophile type may be used as a reactant for producing diepoxides or polyepoxides of the kind which characterize the instant invention. For this reason there is a brief but fairly complete description of this type of diepoxide.

The most common example of the hydrophile type is a product obtained from bisphenol A (p,p'-dihydroxy diphenyl dimethyl methane) and epichlorohydrin, such as $$\underset{O}{\overset{H}{\underset{}{H\!C}}}\underline{\phantom{X}}\overset{H}{\underset{H}{C}}-\overset{H}{\underset{}{C}}-O-\!\!\!\bigcirc\!\!\!-\overset{CH_3}{\underset{CH_3}{\overset{|}{C}}}-\!\!\!\bigcirc\!\!\!-O-\overset{H}{\underset{H}{C}}-\overset{H}{\underset{}{C}}\underline{\phantom{X}}\overset{H}{\underset{O}{C}}H$$

Actually, some of the materials available represent a larger and more complicated molecule and may be more conveniently indicated thus:

1090

$$\begin{array}{c} CH_2 \\ | \\ CH_2 \\ | \\ CH \\ \diagdown O \diagup \\ CH_2 \end{array} \!\!-\!\!O\!-\!\!\bigcirc\!\!-\!\!\overset{CH_3}{\underset{CH_3}{\overset{|}{C}}}\!\!-\!\!\bigcirc\!\!-\!\!\left[\!O\!-\!CH_2\!-\!\overset{OH}{\underset{}{CH}}\!-\!CH_2\!\right]_{n'}\!\!-\!\!O\!-\!\!\bigcirc\!\!-\!\!\overset{CH_3}{\underset{CH_3}{\overset{|}{C}}}\!\!-\!\!\bigcirc\!\!-\!\!O\!-\!\!\begin{array}{c} CH_2 \\ | \\ CH \\ \diagup O \diagdown \\ CH_2 \end{array}$$

in which $n'$ may represent a number including zero but is frequently a low number such as 1, 2 or 3.

As to further examples which illustrate the hydrophobe type of polyepoxide and particularly the diepoxide, see U. S. Patent No. 2,530,353, dated November 14, 1950. Said patent describes compounds having the general formula $$\left[ H_2C\underline{\phantom{X}}\underset{O}{\overset{}{\diagup}}CH\!-\!CH_2\!-\!O\!-\!\!\bigcirc\!\!-\!\!\overset{X_n}{\underset{}{|}}R_n \right]_2$$

wherein R is an aliphatic hydrocarbon bridge, each $n$ independently has one of the values 0 and 1, and X is an alkyl radical containing from 1 to 4 carbon atoms.

As previously noted, particular attention is directed to the available hydrophile type of polyepoxide for the reason that it may be used as a reactant in the preparation of the herein described polyepoxides.

The hydrophile type of polyepoxide and particularly diepoxide is characterized by the freedom from any radical having at least 5 uninterrupted carbon atoms. If for convenience one characterized the hydrophobe type as the aryl type then the hydrophile type of polyepoxides, and particularly diepoxides, may be referred to as nonaryl. Such products have been described in a number of patents. More specifically, such patents are the following: Italian Patent No. 400,973, dated August 8, 1941; British Patent No. 518,057, dated December 10, 1938; U. S. Patent No. 2,070,990, dated February 16, 1937, to Gross et al.; and U. S. Patent No. 2,581,464, dated January 8, 1952, to Zech.

The simplest diepoxide is probably the one derived from 1,3-butadiene or isoprene. Such derivatives are obtained by the use of peroxides or by other suitable means and may be indicated thus:

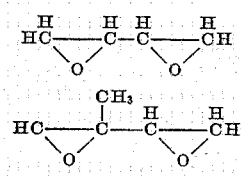

In some instances the compounds are essentially derivatives of etherized epichlorohydrin or methyl epichlorohydrin. Needless to say, such compounds can be derived from glycerol monochlorhydrin by etherization prior to ring closure. An example is illustrated in the previously mentioned Italian Patent No. 400,973:

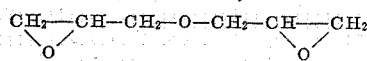

Another type of diepoxide is diisobutenyl dioxide as described in aforementioned U. S. Patent No. 2,070,990, dated February 16, 1937, to Groll, and is of the following formula:

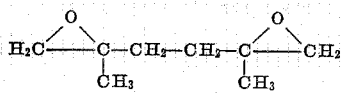

The diepoxides previously described may be indicated by the following formula:

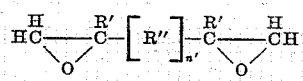

in which R' represents a hydrogen atom or methyl radical, and R" represents the divalent radical uniting the two terminal epoxide groups, and $n'$ is the numeral 0 or 1. As previously pointed out, in the case of the butadiene derivative, $n'$ is 0. In the case of diisobutenyl dioxide R" is $CH_2$—$CH_2$ and $n'$ is 1. In another example previously referred to R" is $CH_2OCH_2$ and $n'$ is 1.

However, for practical purposes the only diepoxide available in quantities other than laboratory quantities is a derivative of gylcerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin, or as might be the case, methyl epichlorohydrin. So presented the formula becomes

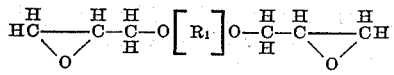

In the above formula $R_1$ is selected from groups such as the following:

$C_2H_4$ $C_2H_4OC_2H_4$ $C_2H_4OC_2H_4OC_2H_4$ $C_3H_6$ $C_3H_6OC_3H_6$ $C_3H_6OC_3H_6OC_3H_6$ $C_4H_8$ $C_4H_8OC_4H_8$ $C_4H_8OC_4H_8OC_4H_8$ $C_3H_5(OH)$ $C_3H_5(OH)OC_3H_5(OH)$ $C_3H_5(OH)OC_3H_5(OH)OC_3H_5(OH)$

The foregoing radicals illustrate groups having not over 4 carbon atoms and thus are the same groups which appear in the polyepoxides and particularly the diepoxides which exemplify the present invention. Also, such groups may be obtained by use of alkylene oxides and obviously also may be obtained by use of hydrophile diepoxides described previously and described in further detail in the text following.

It is to be noted that in the above hydrophile type of epoxides there is a complete absence of (a) aryl radicals and (b) radicals in which 5 or more carbon atoms are united in a single uninterrupted single group. $R_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

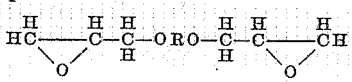

is derived actually or theoretically, or at least derivable, from the diol HOROH in which the oxygen linked hydrogen atoms were replaced by

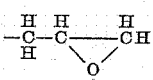

Thus, $R(OH)_n$, where $n$ represents a small whole number which is 2 or more, must be water-soluble. Such limitation excludes polyepoxides if actually derived, or theoretically derived at least, from water-insoluble diols or water-insoluble triols or higher polyols. Suitable polyols may contain as many as 12 to 20 carbon atoms or thereabouts.

Referring to a compound of the type above in the formula

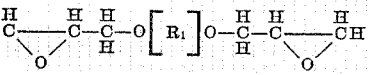

in which $R_1$ is $C_3H_5(OH)$, it is obvious that reaction with another mole of epichlorohydrin with appropriate ring closure would produce a triepoxide or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether; or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

It is well known that there are certain polyalkylene glycols which are water-insoluble notwithstanding the fact that there is not present a hydrophobe radical having at least 8 uninterrupted carbon atoms. This does not apply to polyethylene glycols. Polyethylene glycols are water-soluble even when the undiluted material represents a hard wax-like product. This does not apply to low molal polypropylene glycols and low molal polybutylene glycols. For instance, there are available in the open market polypropylene glycols of the formula $$HOCH_2(CHCH_3OCH_2)_n CHCH_3OH$$

in which $n$ is 2 to 34. Polypropylene glycols having a molecular weight of approximately 150 to 425 are water-soluble. Those of molecular weight ranging from 1,000 or thereabouts to 2,000 or above, are substantially water-insoluble and will show solubility in a hydrocarbon solvent such as xylene, kerosene, or the like. An example is a polypropylene glycol having a molecular weight of approximately 600 or modestly above. The same applies to polybutylene glycol although in this instance there is some variation depending on the particular isomeric oxide from which the glycol was obtained. It goes without saying that everything else being equal the polybutylene glycols show water insolubility and oil solubility in a considerably lower molecular weight than the polypropylene glycols. It is also obvious one can obtain mixed glycols by the use of both propylene oxide and butylene oxide which will show properties somewhere between the two, depending again, at least in part, on the particular butylene oxide employed. Also it is obvious, although ethylene oxide in itself cannot be employed as a source of polyalkylene glycols it can be used in admixture provided such use does not overcome the solubility factor, i. e., does not render them water-soluble, or for some purpose does not materially decrease the solubility in a hydrocarbon solvent, such as xylene or the like. Indeed, in some instances there is a distinct advantage in reacting a small amount of ethylene oxide with a glycol which has been obtained from a higher oxide, or equivalent, i. e., propylene oxide, butylene oxide or a mixture. The reason is that reaction of the terminal radicals with the ethylene oxide insures the presence of a primary hydroxyl radical.

The simplest polyol suitable for the present purpose is a diol or glycol. Such glycols are obtained hypothetically by reacting a mole of water with butylene oxide, propylene oxide or ethylene oxide so as to obtain a product which has the solubility characteristics of the kind previously specified. To a lesser degree glycide or methylglycide may be used although the limitations are obvious. Instead of starting with water one may, of course, start with any suitable reactant of the kind described or may start with a simple glycol such as ethylene glycol, butylene glycol, or propylene glycol. Actually, there are available in the open market a variety of glycols particularly polypropylene glycols or mixtures containing some ethoxy radicals which vary from approximately 600 molecular weight to perhaps as high as 7500. Such materials have been converted into ethers and used for various purposes including the resolution of petroleum emulsions. See, for example, U. S. Patent No. 2,662,859 dated December 15, 1953, to Kirkpatrick. The diols therein employed as reactants may be employed also as reactants in the present invention provided only that they meet the required solubility characteristics. Such raw materials in said U. S. Patent 2,662,859 are described as polyoxyalkylene diols wherein the major proportion of the molecular weight is attributable to oxypropylene groups (e. g., oxy 1,2-propylene) or to mixed oxyethylene and oxypropylene groups in which the weight ratio of oxyethylene to oxypropylene does not exceed 4:1. Where the oxyalkylene groups consist of oxyethylene and oxypropylene groups, the minimum molecular weight should be at least 1350 and preferably at least 2000. The best results have been obtained where the oxyalkylene groups consist of 50% to 100% by weight of oxypropylene groups. With the foregoing limitations the molecular weights of the compounds employed for the purpose of the invention are preferably within the range of 1500 to 7500.

Thus the initial reactant may be considered as a diol (obtained perhaps by reaction of an alkylene oxide and water) or any one of the other compounds described elsewhere and may be indicated by the formula $R(OH)_n$, in which R is free from any radical having more than 4 uninterrupted carbon atoms in a single group and $n$ is a numeral from 2 to 4. If such compound is then reacted with propylene oxide or butylene oxide or a mixture, or a combination of propylene oxide and ethylene oxide, or butylene oxide and ethylene oxide, the product of oxyalkylation may be indicated thus:

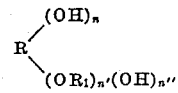

in which $OR_1$ is selected from the class of oxyethylene radicals, oxypropylene radicals, and oxybutylene radicals with the proviso that $n$ represents a numeral from 0 to 2, and $n''$ a numeral from 2 to 4, with the proviso that the sum of $n$ and $n''$ is not over 4; and with the further proviso that $n'$ is a numeral varying from 2 to 200; with the added proviso that at least part of the occurrences of $OR_1$ be selected from the class of oxypropylene, and oxybutylene radicals so that the polyol is water-insoluble and hydrocarbon soluble.

Bearing in mind that one might employ glycide or methyl glycide to a limited degree in the same way that ethylene oxide can be used to a limited degree, it is apparent that the previous formula can be rewritten thus:

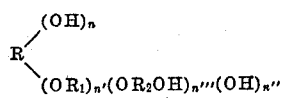

in which all the various characters have their previously mentioned significance with the proviso that $OR_2OH$ is the divalent radical corresponding to a member of the class selected from glycide, or methyl glycide, and $n''$ is a comparatively small whole number less than 10, including 0.

In any event, having obtained a suitable glycol of the kind above described, such glycol is reacted with epichlorohydrin, or the equivalent, to yield corresponding compounds in which the terminal radical appears:

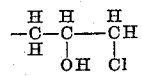

If for convenience this terminal radical is indicated by the symbol $R_2$ then it becomes obvious the two previous formulas, assuming all the hydroxyl groups are converted into the chlorine-containing derivatives may be indicated as follows:

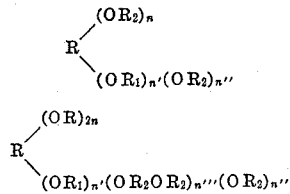

However, there is no need necessarily to convert all the hydroxyl groups provided that at least 2 are converted, i. e., that one obtains a derivative in which there are at least two groups of the radical $OR_2$. This may be indicated thus:

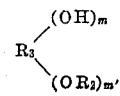

in which $R_3$ is the appropriate polyol residue or, more correctly, the appropriate oxyalkylated polyol residue, in which $m$ is a small whole number not over 4 and including 0, and $m'$ is a small whole number varying from 2 to 4.

The dehydrochlorination of course yields a corresponding polyepoxide which may or may not have free hydroxyls and may be indicated thus:

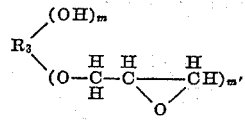

in which $m$ and $m'$ have their previous significance and $R_3$ is the residual radical of the oxyalkylated polyol,

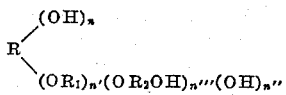

It has been pointed out previously that the present invention is not limited to diepoxides but includes polyepoxides particularly triepoxides and tetraepoxides. For instance, previous reference has been made to the treatment of certain products with ethylene oxide as a terminal reactant. The resultants of such reactions are still diols. However, if instead of using a mole of ethylene oxide one employs a mole of glycide the resultant product is a triol. Similarly, if 2 moles of glycide, or for that matter methylglycide, are employed, the resultant product would be a tetrahydroxylated compound. Such polyhydroxylated compounds can be reacted with epichlorohydrin or the like to yield polyepoxides.

As another illustration one may start with glycerol and react propylene oxide or butylene oxide, or a mixture, and obtain a water-insoluble triol, usually having a molecular weight of 600 or higher. Such material can be treated with 3 moles of epichlorohydrin to yield polyepoxides.

Similarly, water soluble tetra-hydroxylated products such as pentaerythritol or acyclic diglycerol can be reacted with propylene oxide or butylene oxide or a mixture to yield a water-soluble tetrahydroxylated compound. Such product in turn may be reacted with epichlorohydrin to yield a polyepoxide. For a number of reasons the most desirable compound is obtained from a diol and the second most desirable class appears to be obtained from triols, such as glycerol, 1,1,1-tris-(hydroxymethyl)ethane, etc.

Also, it is obvious that if one starts with a polyol having more than 2 hydroxyls then polyepoxide can be obtained in which there is at least one or possibly more residual hydroxyl radicals. Thus, oxypropylated glycerol can be reacted with 2 moles of epichlorohydrin yielding a substantial amount of a compound in which there are present 2 epichlorohydrin groups and one hydroxyl group. As to oxyalkylated glycerol see U. S. Patent No. 2,665,312, dated January 5, 1954, to Ohlmann et al. Similarly, acyclic diglycerol will yield a comparable product having 2 or 3 epoxide radicals and 2 or one residual hydroxyl radicals. The main difficulty in the preparation of this type of compound is the tendency toward self-polymerization characteristic of comparable compounds such as glycide or methylglycide.

Previous reference has been made to the fact that the hydrophile type of polyepoxide and particularly diepoxide will be used to prepare a suitable polyol and particularly a diol which becomes the initial reactant in the present manufacturing procedure. This, however, requires explanation for the reason that obviously a water-insoluble diol or the equivalent, for instance, polypropyleneglycol having a molecular weight of approximately 600 to 700, could be reacted in a molal ratio of two moles of the glycol with one mole of a diepoxide as previously described, for instance,

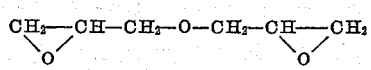

to yield a suitable tetraol which then could be reacted with epichlorohydrin. Similarly, one might use a polybutyleneglycol having a molecular weight of about 600 or a mixed glycol which had been prepared by the use of both butylene oxide and propylene oxide. Indeed, in either instance the glycol could be reacted with a small amount of ethylene oxide provided, of course, that the reaction product after combination with a hydrophile diepoxide still met the solubility requirements noted elsewhere in the text.

Where reference has been made to the use of ethylene oxide, butylene oxide, or propylene oxide, and particularly the latter, certain glycidyl ethers could be substituted such as allylglycidyl ether, isopropyl glycidyl ether, ethylene glycidyl ether, or the like.

PART 2

In addition to the other polyols which have been described as suitable reactants, attention is directed to the specific description of certain suitable polyols which appear in U. S. Patents Nos. 2,626,903, 2,626,904 and 2,626,905, all dated January 27, 1953, to De Groote, and 2,652,421, 2,652,422 and 2,652,424, all dated September 15, 1953, to De Groote.

Any desired procedure may be employed in the preparation of the present polyepoxides and particularly diepoxides. As far as the reaction with epichlorohydrin is concerned it is our preference to use boron trifluoride as a catalyst.

In the dehydrochlorination it is our preference to use either caustic soda in powder or pellet form, or in any suitable form, or to use sodium aluminate. To the extent that a solvent is required it is our preference to use isopropyl ether or dioxane as a solvent. As to patents which show these various steps but not in the preparation of diepoxides of the kind herein described, see U. S. Patents Nos. 1,446,872, dated February 27, 1923; 2,061,377, dated November 17, 1936; 2,070,990, dated February 16, 1937; 2,224,849, dated December 17 1940; 2,248,635, dated July 8, 1941; 2,314,039, dated March 16 1943; 2,351,025, dated June 13, 1944; and 2,538,072, dated January 16, 1951.

Any suitable procedure can be employed in the reaction involving epichlorohydrin and the selected polyol particularly a diol. Due to ready availability and low cost we prefer to use polypropyleneglycols as the reactants. Furthermore, in the use of a diol there is less opportunity for complicating reactions than when triols or tetrahydroxy compounds are used.

The following examples illustrate the condensation procedure:

*Example 1a*

3,000 grams of polypropylene glycol 1200 (2.5 moles) were mixed with 30 cc. of a 10% solution of boron fluoride in ether. This represented about 2 or 3 grams of boron fluoride. The temperature was raised to about 80° C. and held at this temperature within 3° in either direction. About 7½ moles of epichlorohydrin (699 grams) were added over a period of 4 or 5 hours. At the end of this time the reaction appeared to be complete.

Immediately following is Table I which shows in tabular form a number of other condensations conducted in the same manner as described above.

TABLE I

| Ex. No. | Polyhydroxylated compound | Grams | Moles | Epichlorohydrin | | 10% BF₃ solution, cc. | Temp., °C. | Time, hrs. |
| --- | --- | --- | --- | --- | --- | --- | --- | --- |
| | | | | Grams | Moles | | | |
| 1a | Polypropylene glycol 1200 | 3,000 | 2.5 | 699 | 7.5 | 30 | 80 | .5 |
| 2a | Polypropylene glycol 400 | 600 | 1.5 | 419 | 4.5 | 9 | 80 | 3 |
| 3a | Polypropylene glycol 750 | 750 | 1.0 | 279 | 3.0 | 9 | 80 | 4 |
| 4a | Polypropylene glycol 1000 | 500 | 0.5 | 140 | 1.5 | 5 | 80 | 4 |
| 5a | Polypropylene glycol 2000 | 400 | 0.2 | 56 | 0.6 | 4 | 80 | 4 |
| 6a | Tributylene glycol | 552 | 2.0 | 556 | 6 | 10 | 85 | 4 |
| 7a | Tetrabutylene glycol | 362 | 1.0 | 279 | 3 | 5 | 85 | 4 |
| 8a | Pentabutylene glycol | 448 | 1.0 | 279 | 3 | 6 | 85 | 4 |
| 9a | Hexabutylene glycol | 534 | 1.0 | 279 | 3 | 6 | 85 | 5 |
| 10a | Heptabutylene glycol | 620 | 1.0 | 279 | 3 | 7 | 85 | 5 |
| 11a | Dimethyl tetrabutylene glycol | 306 | 1.0 | 279 | 3 | 5 | 80 | 4 |

It is to be noted that the amount of epichlorohydrin employed is greater than mole-for-mole based on the hydroxyl present in the polyhydroxylated compound. We have found this necessary to obtain a suitable yield. Thus, it well may be, and probably is true, that the number of chlorine atoms in the intermediate product is greater than one-to-one based on the hydroxyl radical. Also, it is true that in the course of dehalogenation some epichlorohydrin may be converted into a hydroxylated compound or derivative.

Having obtained the epichlorohydrin derivatives as described above, the intermediate product is subjected to dehalogenation. A number of procedures can be employed and the following illustrations will serve.

*Example 1b*

In this procedure the sodium aluminate method was used. Epichlorohydrin derivative Example 1a was employed as the intermediate. 1130 grams of this material were mixed with 530 grams of technical sodium aluminate, along with 111 grams of water and 1800 grams of dioxane. The mixture was stirred at room temperature for about a half hour and then heated under reflux condenser for 10 hours. The mixture refluxed at approximately 95° C. At the end of this time the reaction mass was filtered and the filter residue washed with dioxane. The filtrate was then subjected to vacuum stripping so as to remove the solvent by use of a temperature of 150° C. under 30 mm. pressure.

The epoxide value determination on the stripped residue showed approximately 2 epoxide radicals per mole, i. e., the value being 1.87 in one instance and 1.90 in the other.

The yield was 1019 or slightly over 93% based on the initial diol.

*Example 2b*

A similar experiment was repeated, using slightly small quantities, to wit, 200 grams of Intermediate Example 1b, 95 grams of sodium aluminate, 20 grams of water, and 300 grams of dioxane. The amount of product obtained was 180 grams (again a 93% yield) and the epoxide value was substantially the same as before.

*Example 3b*

In this procedure the caustic soda method was employed instead of using sodium aluminate. 200 grams of condensate Example 2a were mixed with 600 grams of isopropyl ether and 21 grams of caustic soda. The mixture was stirred and the temperature held at 30° C., plus or minus 5, for seven hours. The caustic soda in flake form was added in 4 portions. 40% of the caustic soda was added during the first hour, 30% during the second hour, 20% was added during the third hour, and 10% in the fourth hour. After the final addition of caustic soda the mixture was then stirred for 4 hours longer. The mixture was allowed to settle for approximately 3 days, decanted, washed with 100 grams of isopropyl ether and then filtered over 50 cc. (volume measurement) of diatomaceous earth.

The ratios of epoxide radicals per molecule were the same as in previous examples and the yield was approximately the same.

Using the same procedure, or obvious variants, a number of other intermediates were prepared which appear in Table II and are identified as Examples 1b through 13b. Note that where the solvent is designated with an (A) or (B), the (A) indicates the solvent was dioxane, and the (B) shows the solvent was isopropyl ether.

TABLE II

| Ex. No. | Epichlorohydrin derivatives of— | | Dehalogenation reagent | | | Temp., °C. | Time, hrs. | Solvents, grams | Yield, percent |
| --- | --- | --- | --- | --- | --- | --- | --- | --- | --- |
| | Ex. No. | Grams | NaOH, grams | NaAlO₂, grams | H₂O, grams | | | | |
| 1b | 1a | 1,130 | | 530 | 111 | 93-95 | 10 | 1,800 (A) | 93 |
| 2b | 1a | 300 | | 95 | 20 | 93-95 | 10 | 300 (A) | 93 |
| 3b | 1a | 200 | 21 | | | 30-35 | 7 | 600 (B) | 93 |
| 4b | 2a | 339 | 79 | | | 30-35 | 6 | 1,000 (B) | 90 |
| 5b | 3a | 480 | | 322 | 68 | 93-95 | 9 | 720 (A) | 92 |
| 6b | 4a | 557 | | 300 | 63 | 93-95 | 10 | 770 (A) | 93 |
| 7b | 5a | 400 | | 121 | 25 | 93-95 | 10 | 550 (A) | 92 |
| 8b | 6a | 370 | 105 | | | 30-35 | 6 | 1,100 (B) | 91 |
| 9b | 7a | 300 | 74 | | | 30-35 | 6 | 900 (B) | 89 |
| 10b | 8a | 460 | 100 | | | 30-35 | 7 | 1,400 (B) | 88 |
| 11b | 9a | 272 | 53 | | | 30-35 | 7 | 800 (B) | 90 |
| 12b | 10a | 450 | | 345 | 72 | 93-95 | 9 | 620 (A) | 91 |
| 13b | 11a | 585 | 158 | | | 30-35 | 6 | 1,700 (B) | 89 |

In regard to the above procedure, reference is made to the following patents which are concerned with boron fluoride as a catalyst; or dehydrochlorination procedure employing either sodium aluminate or caustic soda; and also in one instance a patent is concerned with the use of dioxane as a solvent;

| U. S. Patent No. | Date |
| --- | --- |
| 1,446,872 | Feb. 27, 1923 |
| 2,061,377 | Nov. 17, 1936 |
| 2,070,990 | Feb. 16, 1937 |
| 2,224,849 | Dec. 17, 1940 |
| 2,248,635 | July 8, 1941 |
| 2,314,039 | Mar. 16, 1943 |
| 2,351,025 | June 13, 1944 |
| 2,538,072 | Jan. 16, 1951 |

The products derived in the manner above described, i. e., the polyepoxides and particularly the diepoxides, are generally light colored or sometimes straw or amber colored. The amount used in most instances is so small that this color is not objectionable. If required, however, the products could be bleached by use of filtering clays, charcoal, or the like.

PART 3

Polyepoxides and particularly the diepoxides derived in the manner herein described are useful as chemical reactants for various purposes. For instance, they may be used for the same purposes as the two other types of polyepoxides described in Part 1.

Being essentially hydrophobe in character they can combine readily with hydrophile products to give resultants which have a hydrophobe-hydrophile balance so as to produce surface-activity. For example, the herein described polyepoxides or diepoxides may be combined with amines, such as polyamines, oxyethylated amines, such as oxyethylated triethanolamine, oxyethylated tetraethylene pentamine, and the like, to give valuable derivatives. For instance, two moles of the oxyethylated amine (either monoamine or polyamine) can be reacted with one mole of a diepoxide of the kind herein described. This applies also to other products, such as oxyethylated sorbitol, oxyethylated methyl glucoside, oxyethylated pentaerythritol, oxyethylated acyclic diglycerol, etc. In the same way products are obtained which are effective surface-active agents.

In our co-pending applications, Serial No. 415,179, and Serial No. 415,180, both now abandoned, we have employed the herein described polyepoxides and particularly diepoxides in two ways. In the first co-pending application the solvent-soluble phenolaldehyde resin was treated with a diepoxide and then subjected to oxyalkylation; in the second co-pending application the resins are first subjected to oxyalkylation and then to reaction with a diepoxide or the like. Products so obtained are valuable for a number of purposes and particularly for the resolution of petroleum emulsions of the water-in-oil type.

Having thus described our invention, what we claim as new and desire to secure by Letters Patent is:

1. A polyepoxide of the structure

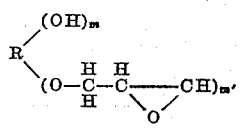

in which $m$ is a small whole number not over 4 and including 0, and $m'$ is a small whole number varying from 2 to 4, and R is the residual radical of the intermediate polyol

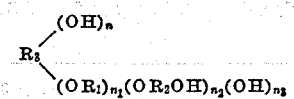

in which $n$ is a small whole number varying from 0 to 2, $OR_1$ is selected from the class consisting of oxyethylene radicals, oxypropylene radicals, and oxybutylene radicals; $OR_2OH$ is selected from the class consisting of oxy(hydroxy)propylene radicals and oxy(hydroxy)butylene radicals; $n_1$ is a numeral varying from 2 to 200; $n_2$ is a numeral varying from 0 to 8 and $n_3$ is a numeral varying from 2 to 4 with the proviso that the sum of $n$ and $n_3$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n4}$ in which $n_4$ is a small whole number varying from 2 to 4.

2. A diepoxide of the structure

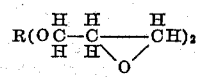

in which R is the residual radical of the intermediate diol

in which $OR_1$ is selected from the class consisting of oxyethylene radicals, oxypropylene radicals, and oxybutylene radicals; with the proviso that $n_1$ is a numeral varying from 2 to 200; and with the proviso that the radical $R_3$ consist essentially of a polyoxypropylene chain and be the residual radical of the initial precursory polyoxypropylene glycol having a molecular weight of 1100 to 1300.

References Cited in the file of this patent

UNITED STATES PATENTS

| | | |
|---|---|---|
| 2,555,169 | Voorthuis | May 29, 1951 |
| 2,637,713 | Suen et al. | May 5, 1953 |

FOREIGN PATENTS

| | | |
|---|---|---|
| 518,057 | Great Britain | Feb. 15, 1940 |